June 27, 1950  R. J. SAVAGE ET AL  2,513,254
KETTLE SCRAPING UNIT
Filed Sept. 19, 1947  4 Sheets-Sheet 1
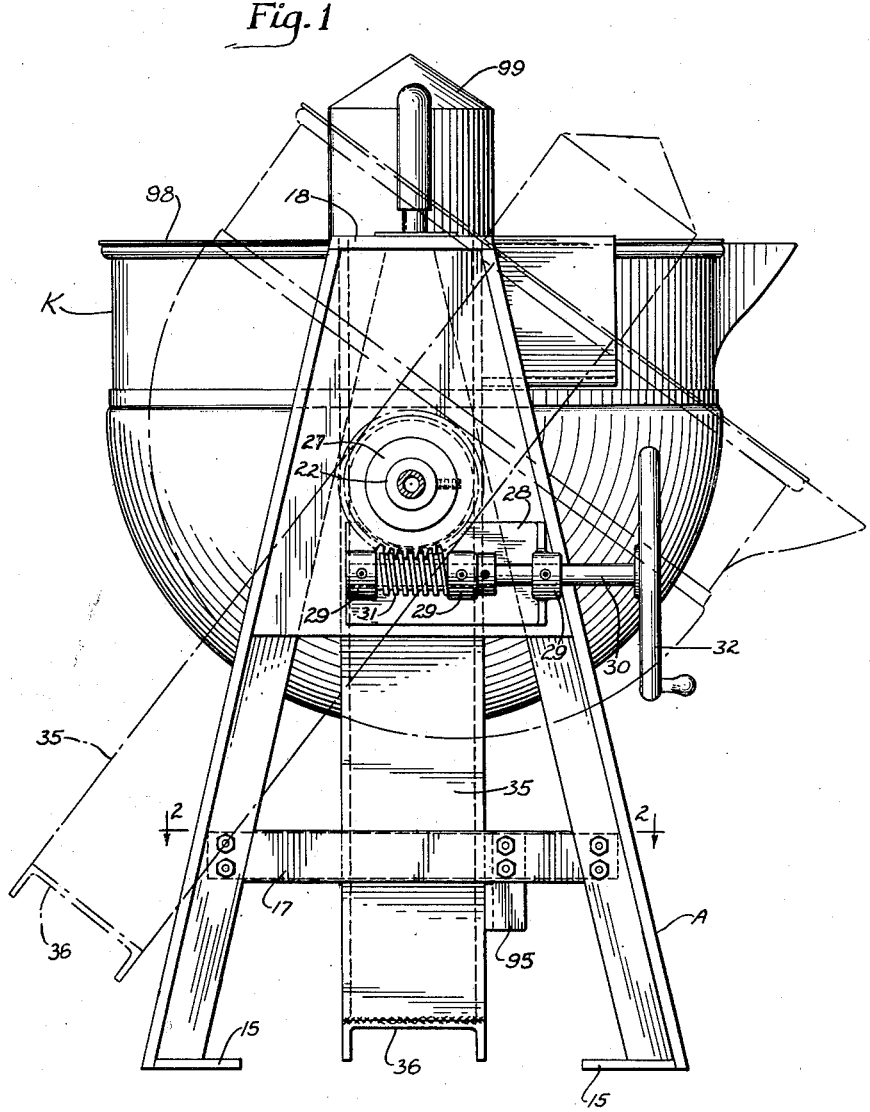
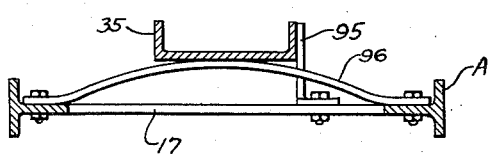
INVENTORS
Richard J. Savage
Robert E. Savage
By Benning & Benning
Attys.

June 27, 1950  R. J. SAVAGE ET AL  2,513,254
KETTLE SCRAPING UNIT
Filed Sept. 19, 1947  4 Sheets-Sheet 2
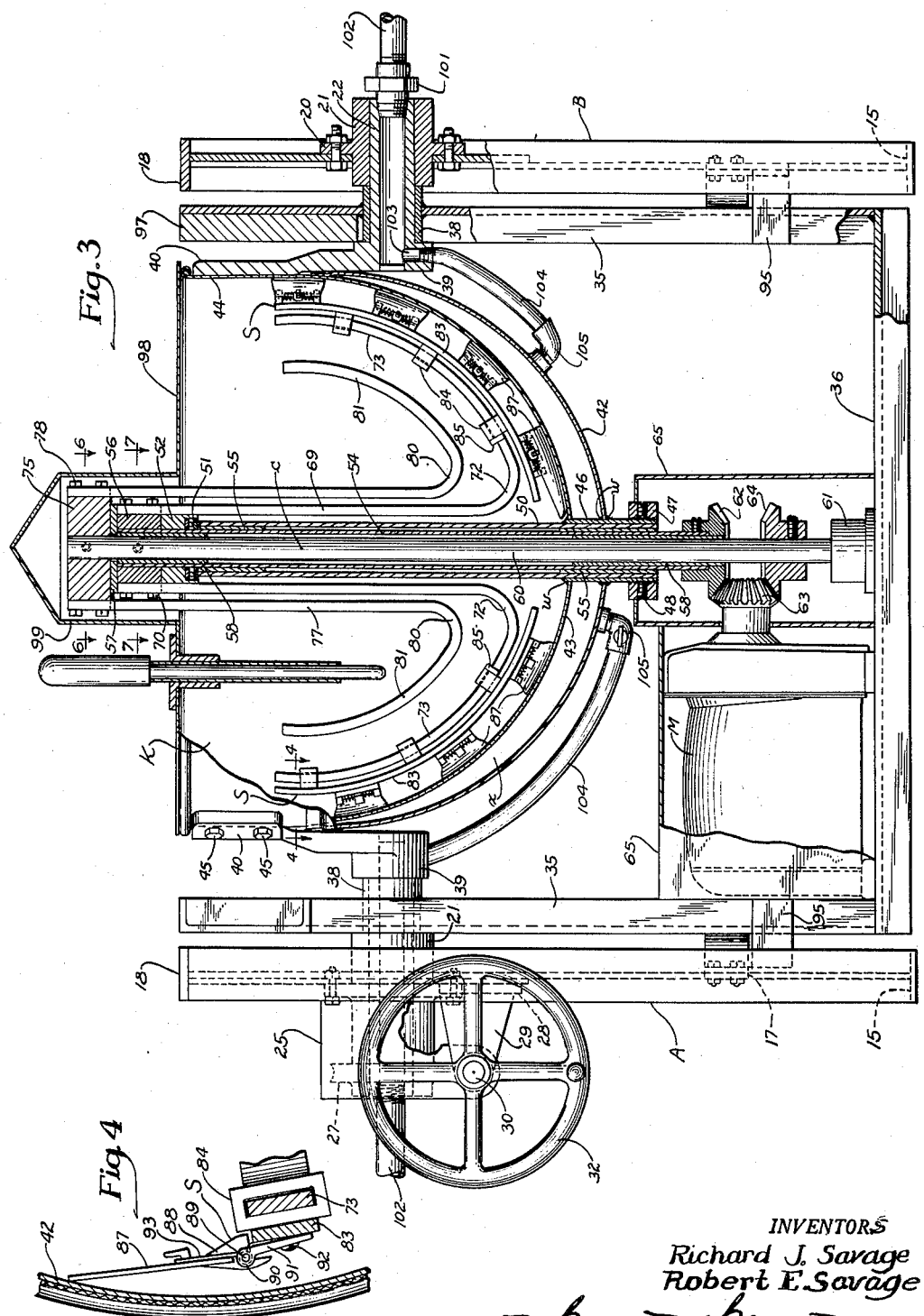
INVENTORS
Richard J. Savage
Robert E. Savage
By Cunning & Cunning
Attys.

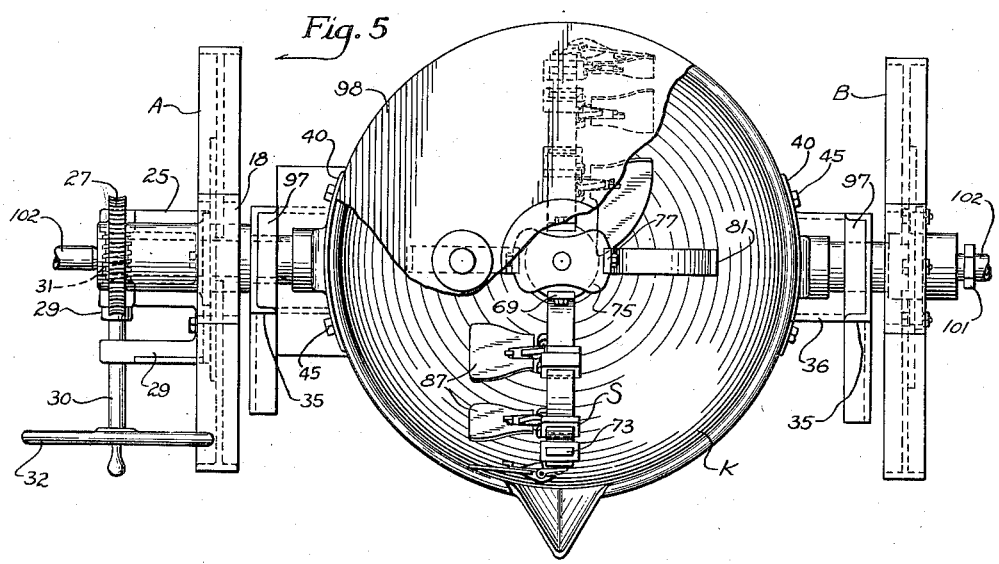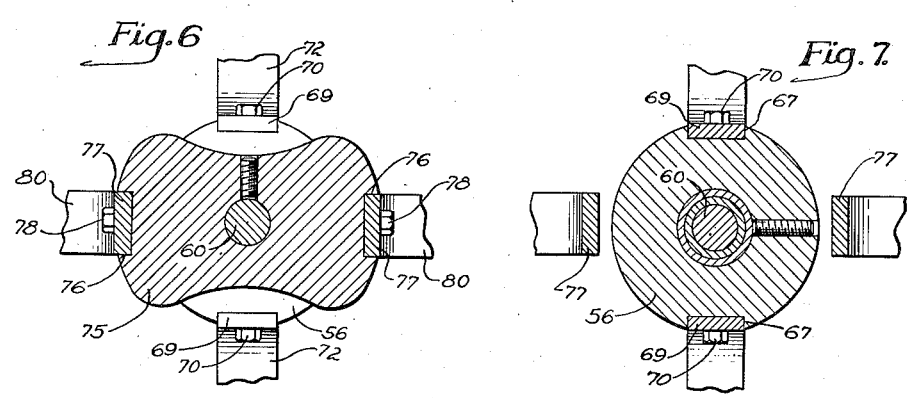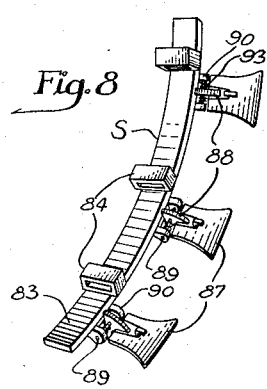

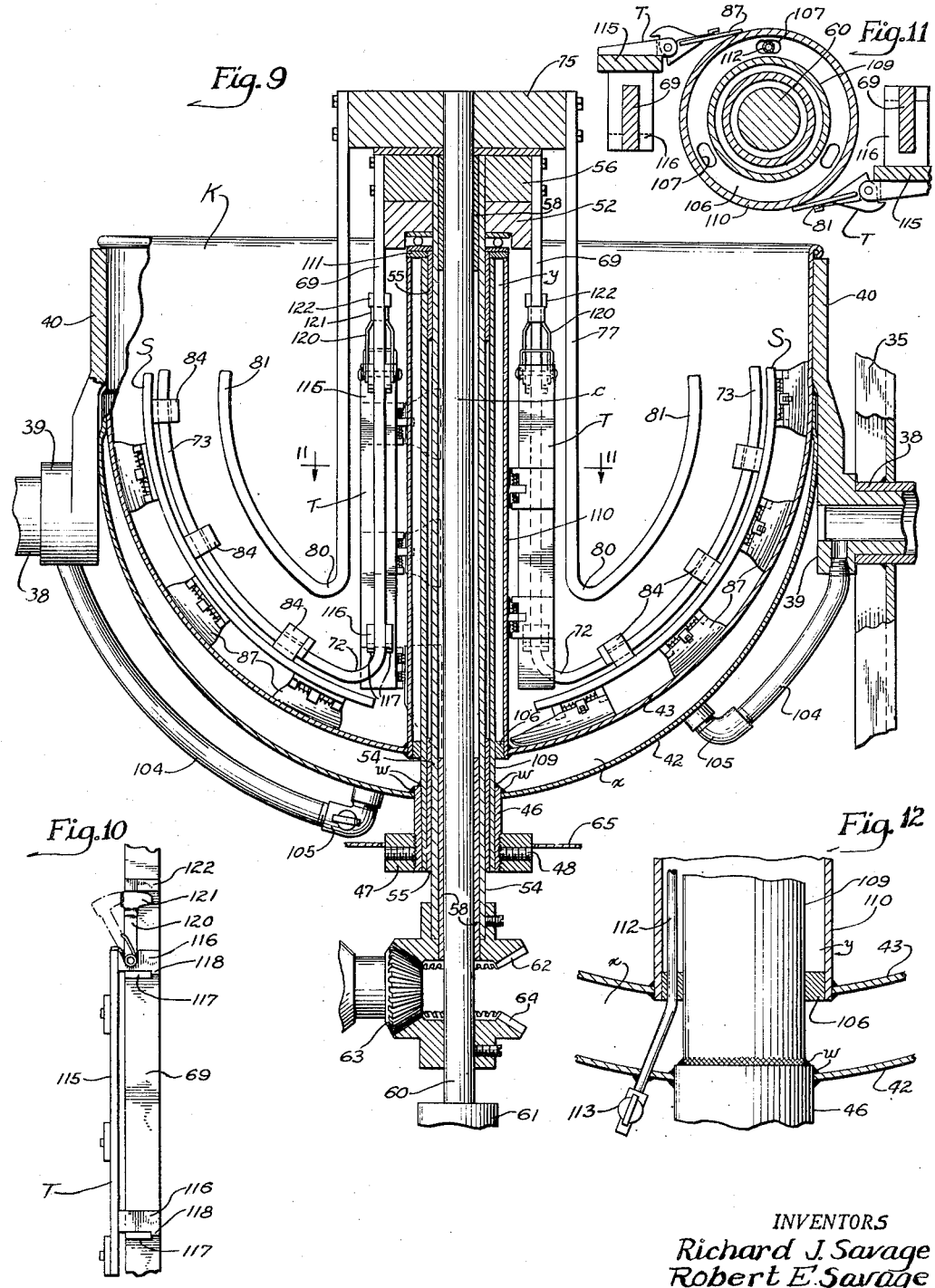

Patented June 27, 1950

2,513,254

UNITED STATES PATENT OFFICE 2,513,254

KETTLE SCRAPING UNIT

Richard J. Savage, Oak Park, and Robert E. Savage, Winnetka, Ill., assignors to Savage Bros. Company, Chicago, Ill., a corporation of Illinois Application September 19, 1947, Serial No. 775,034

7 Claims. (Cl. 259—107)

This invention relates to a mixer in the form of a kettle which is provided with stirring mechanism, the kettle being tiltably mounted so that, at the conclusion of each cooking operation, the entire batch of treated material may be poured over the kettle rim into a receptacle or receptacles provided for the purpose. A mixing-kettle of this general kind may be used with advantage in the commercial production of candies, certain food products, and also of various other compositions.

It is an important object of our invention to simplify the construction of a mixing-kettle of the kind noted. Accessibility to the operating parts which may require attention or cleaning from time to time, is also achieved by our improved mixing-kettle. In addition, we provide scraper units which are removably mounted on rotating stirring arms, each scraper unit being readily detachable from its supporting arm whenever a cleaning operation is to be performed. Provision is also made for cooking the ingredients contained within the mixing-kettle which for this purpose is jacketed to receive an inflow of steam whereby the contents of the kettle may be raised to a relatively high temperature, perhaps 240° F. or so. A novel and improved mounting for rotating the scraper units is also a feature of my invention, this mounting which includes a pair of oppositely rotatable shafts being extended through the kettle jacket with provision for preventing escape of steam therefrom without the aid of any stuffing box, conventional or otherwise.

A mixing-kettle of this general kind embodies also other objects and advantages as will hereinafter appear more fully from the description and claims, taken in conjunction with the accompanying drawings wherein Figure 1 is an end elevation of the mixing-kettle;

Fig. 2 is a detail in section, taken on line 2—2 of Fig. 1;

Fig. 3 is a front elevation thereof, partly broken away to exhibit a central longitudinal sectional view of the kettle and various of the operating parts therewithin;

Fig. 4 is a detail in section, enlarged, taken on line 4—4 of Fig. 3;

Fig. 5 is a top plan view of the kettle;

Figs. 6 and 7 are enlarged details in transverse section taken, respectively, on lines 6—6 and 7—7 of Fig. 3;

Fig. 8 is a detail in perspective of one of the scraper units detached from its supporting arm;

Fig. 9 is a vertical sectional view taken centrally through a mixing-kettle of modified construction;

Fig. 10 is a view in side elevation of one of the inside scraper units attached to its supporting arm when constructed as per Fig. 9;

Fig. 11 is a detail in section, taken on line 11—11 of Fig. 9; and

Fig. 12 is a fragmentary detail in vertical section of the kettle bottom and columnar jacket extended therethrough.

Referring first to Figs. 1 and 2, we provide two A-frames A and B, substantially alike, one at each end of the machine. These frames are equipped with feet 15 by which they may be secured firmly to a floor or other base. As shown, each upright in the A-frame is of T cross section, with the center webs extended inwardly toward each other. This makes for a strong construction which will support a heavy load. Near the bottom of each A-frame is a cross brace 17 and at the top thereof a cap plate 18.

Secured to each A-frame near its top is the flange 20 of a bearing 21 (see Fig. 3) wherein is rotatably supported a hollow shaft 22, the two shafts at opposite ends of the machine being coaxial in a horizontal plane. The bearing 21 supported by the frame A is surrounded by a housing 25 wherein is accommodated a worm wheel 27 having a fast connection with the hollow shaft 22. Directly below the housing is a base plate 28 (see Fig. 1) affixed to the A-frame and provided with a plurality of arms 29 each supporting a bearing wherein is a rotatable shaft 30 formed with a worm 31 in mesh with the worm wheel 27. A hand wheel 32 carried fast on the shaft 30 provides an operating means whereby motion may be transmitted through the worm gear connection to the hollow shaft 22.

A U-shaped cradle is tiltably supported between the two A-frames. As shown best in Fig. 3 this comprises a pair of channeled uprights 35, one adjacent each A-frame, each extending substantially to a point even with the top thereof. The two uprights are connected at the bottom by a channel beam 36 and are provided at a point opposite the proximate bearing 21 with a sleeve 38 that is secured fast thereto, as by welding. Each sleeve 38 which surrounds one hollow shaft 22 provides a bearing therefor. The inner end of each shaft 22 terminates in a head 39 from which rises a supporting arm 40.

The mixing-kettle K, which is best shown in Fig. 3, is of generally hemispherical shape with its center c at an elevation slightly below the top and above the aligned axes of the two shafts 22. The kettle is provided with a jacket 42 to the outside of its hemispherical bottom 43 from which it is separated to provide an enclosed space defining a steam chamber $x$ which extends upwardly to an elevation nearly as high as the center point $c$. The two arms 40 engage with straight sides 44 of the kettle at diametrically opposite points, being secured thereto as with the aid of bolts 45.

At the center of the kettle, extending through its bottom 43 and jacket 42, is a nipple 46. This nipple, which may be affixed securely in place as by welding $w$, is extended below the kettle so as to expose its lower end portion which is exteriorly threaded for support thereon of a collar 47 whose position is fixed by set screws 48. Formed within the nipple 46 and extending upwardly from a point opposite the collar 47 is a sleeve 50 upon whose upper end is rested an annulus 51 forming part of an anti-friction raceway which abuts a collar 52. The sleeve 50 which constitutes a hollow column is spaced outwardly of a tube 54 from which said sleeve 50 remains separated with the aid of spacer sleeves 55 at top and bottom. The tube 54 extends upwardly through the collar 52 and also through a head 56 thereabove into abutting relation with an annular plate 57. The upper spacer sleeve 55 may also abut the annulus 51 of the raceway so as to assist in supporting the same at a fixed elevation. Other spacer sleeves 58 may also be provided internally of the tube 54 at the top and bottom thereof to maintain the same separated from a central shaft 60 which extends from a point above the plate 57 down below the collar 47 to rest upon a base block 61 which is carried by the channel beam 36 of the cradle.

Below the collar 47 is extended the tube 54 which carries a bevel gear 62 in mesh with a pinion 63 which meshes with an opposed bevel gear 64 that is affixed to the central shaft 60. The pinion 63 is carried fast upon the shaft of a motor M which is based upon the channel beam 36. A housing 65 may be provided to enclose the motor and also the gears 62, 63, and 64 which constitute a drive for the tube 54 in one direction and for the shaft 60 in the opposite direction. It will be obvious that through the nipple 46 and the collar 47 and the casing 65, the cradle is connected fast to the kettle.

The head 56 is secured fast to the tube 54 whereby to rotate therewith. Formed in opposite sides of this head (see Fig. 7) are wide shallow grooves 67 in each of which may be received the upper end of a strap-bar 69 which is secured thereto as by bolts 70. Two bars 69 are extended downwardly from the head 56 along opposite sides of the sleeve 50 to points relatively close to the bottom 43 of the kettle where they execute a bend 72 of something more than 90°, and then continue upwardly in the form of stirring arms 73 which in an endwise direction are arcuate about a center which is approximately that of the center point $c$ of the kettle. Each stirring arm 73 remains spaced from the kettle, proceeding upwardly therealong in a uniformly spaced relation thereto.

Above the annular plate 57 is a second head 75 which is connected fast to the shaft 60. This upper head is also provided at diametrically opposite points with shallow grooves 76 (see Fig. 6) each adapted to receive the upper end of a strap-bar 77 which may be secured thereto as by bolts 78. The two bars 77 extend downwardly, slightly to the outside of the inner bars 69, and at relatively low down points execute bends 80 of something more than 90° preliminary to ascending in the form of stirring arms 81 which are endwise arcuate much the same as the stirring arms 73 so as to remain substantially uniformly spaced therefrom to the inside thereof. When the motor M is in operation, the two sets of stirring arms will be rotated oppositely within the kettle through the transmission heretofore described.

We provide for each of the outer stirring arms 73 a scraper unit S of novel and improved construction. As shown best in Figs. 4 and 8, this may comprise an arcuate mounting bar 83 to which is affixed a plurality of brackets here shown as loops 84 each configured internally to snugly embrace one of the stirring arms 73. Each mounting bar 83 is adapted to be slipped over the upper end of one stirring arm 73, each of the loops 84 fitting over the arm to guide the mounting bar 83 through an endwise arcuate movement as far as permitted by engagement of its lowermost loop with a stop 85 that is affixed to the stirring arm 73 at a point relatively close to its bend 72 (see Fig. 3). Manifestly the mounting bar 83 may be raised through an arcuate path to slide off the stirring arm 73 whenever the scraper unit is to be removed therefrom.

Each mounting bar 83 carries a plurality of like scrapers, three being the number shown. Each scraper may comprise a blade 87 having a bifurcated rib 88 which is pivotally mounted upon a pintle 89 supported between ears 90 formed on a base 91 which is affixed as by screws 92 to the mounting bar 83. The swinging movement of each blade is limited by engagement of its rib 88 alternately with the bar 83 and base 91 (see Fig. 4). A spring 93 encircling the pintle 89 exerts opposing forces on the base 91 and blade 87 whereby the latter is urged into continuous engagement with the kettle wall 43. If the stirring arms 73 be revolved within the kettle, the scraper units are carried therewith in such a way that each of the blades 87 will scrape against the inner wall of the kettle to prevent, or at least retard, the accumulation of any solids thereon. Similar scraper units are carried upon the two stirring arms 73, the positions of the scrapers in the two units being preferably staggered so that each blade will follow a predetermined individual circular path in its movements around within the mixing kettle, all the paths being contiguous with little or no overlap so that the entire surface of the kettle interior will be subjected to the scraping action thereof.

The normal vertical position of the mixing kettle is as indicated in Fig. 1. The mounting of the kettle with respect to the cradle is fixed so that, when the cradle is tilted with respect to the supporting A-frames (as indicated by the dot and dash lines in Fig. 1), the kettle will be moved as a unit therewith. In its normal upright position each cradle upright 35 is adapted to engage with a stop 95 which is carried by the cross brace 17 of the A-frame. An inwardly bowed guide bar 96 extended between the uprights of each A-frame is adapted to engage lightly with the proximate cradle upright 35, when in its normal position (see Fig. 2) to oppose any endwise relative motion between the cradle and its supporting A-frames. The cradle is free to be tilted only in the direction which produces a separation between its two uprights 35 and the stops 95. These tilting movements are in response to operation of the hand wheel 32, and to provide an assisting counter-balance we may affix to each cradle upright 35 a weight 97 at the top end thereof above its tilting axis. Such a weight may readily be provided by a casting of lead or the like which lends itself to retention between the flanges of the channel upright. A lid 98 which serves as a cover for the kettle is provided with a central dome 99 which rises therefrom to enclose the two heads 75 and 56 together with the upper ends of the bars carried thereby.

Connected to each hollow shaft 22, as by a swivel joint 101, is a steam conduit 102 (see Fig. 3). One such conduit, say the one at the frame B, is in connection with a steam supply source (not shown), the other conduit then leading to a point of exhaust (or recovery). At the inner end of each hollow shaft 22 is a passageway 103 extending laterally opposite the supporting arm 40, a conduit 104 leading from each such passageway to a fitting 105 which communicates with the steam chamber $x$ to the outside of the kettle K. One of the conduits 104—the one proximate to the discharge end of the steam line—then connects with the steam chamber at a point relatively close to the kettle center, whereas the corresponding connection for the conduit 104 is somewhat higher. By the means described I provide for the passage of steam into and through the chamber $x$ surrounding the kettle whereby to cook or condition the ingredients that are to be thermally treated therein while an operation of stirring concurrently proceeds.

Turning now to the modified construction of Figs. 9-11, the kettle K here shown is substantially the same as that of Figs. 1, 3, and 5, as are also the supporting A-frames therefor, the steam connections thereto and therefrom, and the stirring arms (except as hereinafter noted). Corresponding parts in Figs. 1-8 on the one hand and in Figs. 9-11 on the other, are accordingly designated by like reference characters for convenience and facility in an understanding thereof. The main point of departure in Figs. 9-11 relates to the provision of an annular steam chamber $y$ centrally within the kettle in connection with a vertical column which encloses the shaft 60 that is rotatable in a direction oppositely of the spaced surrounding sleeve 50 to provide transmission for outer and inner stirring arms 73 and 81, respectively.

The kettle bottom 43 in the construction of Fig. 9 is centrally apertured to receive a collar 106 through which are openings 107 in parallelism with its axis, to provide communication between the steam chamber $x$ and the annular chamber $y$ which is defined by a sleeve 109 to the inside and a columnar jacket 110 to the outside. At its base the columnar jacket 110 joins with the kettle bottom 43 with which it is in tight connection adjacent the periphery of the collar 106; this jacket extends upwardly to a point nearly even with the kettle top to join with and be secured to an annular head plate 111 to which the upper end of the sleeve 109 is also secured. This inside sleeve 109 extends downwardly through the chamber $x$ and into the nipple 46 with which it is in fluid-tight connection as by welds $w$. By the means described, I provide a vertical steam chamber $y$ extending centrally within the kettle in the form of a column, the steam admitted to the chamber $x$ being free to ascend within the columnar chamber $y$ to deliver heat at this central point to the body of the surrounding liquid within the kettle K. A pipe 112 open at the top extends upwardly from below the kettle through the chamber $y$ to vent the air therefrom through a pet cock 113 at its bottom end.

Within the inner sleeve 109 are spacers 55 for supporting the tube 54 whose lower end is connected fast to the bevel gear 62 as previously described. This tube extends upwardly through the head plate 111 and through a surmounting collar 52 for fast connection with the head 56 which is adapted to be rotated thereby. The shaft 60 is maintained by spacer sleeves 58 in separated relation to the rotatable tube 54, and through its fast connection at the bottom with the bevel gear 64 is adapted to be driven thereby for transmitting rotary motion to the upper head 75 in a direction which is opposite to that in which the lower head 56 is driven. Depending from the upper head 75 are outer bars 77 executing at a bottom point bends 80 from which they proceed upwardly again to provide stirring arms 81 which are arcuate endwise in general conformity with the curvature of the kettle K.

The lower head 56 supports the upper ends of inner bars 69 which depend vertically in relatively close relation to the columnar jacket 110, then bend around at 72 to ascend arcuately in the form of stirring arms 73 each of which may carry a scraper unit S the same as already described. Another scraper unit T is carried by each vertical bar 69 in operative relation to the columnar jacket 110. This is desirable in order that the surface of this jacket may be kept clean by continuous scraping during use of the kettle. Each scraper unit T, which is readily removable from its supporting stirring arm comprises a mounting bar 115 having a plurality of laterally extending clips 116 each bifurcated to straddle the bar 69 and engage a lug 117 which is carried thereby. The clip ends may be downwardly projected at 118 to provide depending hooks each adapted to engage the proximate end of one lug 117 whereby to secure the mounting bar 115 in a fixed position upon the bar 69 from which it may be disconnected only by an initial upward movement. Upon the top clip 116 is pivotally mounted an upwardly extending spring-biased latching arm 120 having at its free end a shoulder 121 adapted to swing in beneath a stop 122 that is carried by the bar 69. In its latched position (see Fig. 10) the mounting bar is secured fixedly against movement upon its supporting bar 69. The latch must first be retracted to free the mounting bar for upward movement before its removal from the supporting bar 69 can take place. The mounting bar carries one of the scraper units T comprising a plurality of spring-pressed scraper blades 87 which may be the same in construction as those heretofore described. The blades on the two mounting bars are preferably staggered so that every portion of the surface of the columnar jacket 110 will be engaged during operation of the kettle.

The tilting mixer of our invention is advantageous in that it dispenses with a stuffing box and packing at the point where the kettle bottom is traversed by the column and the operating parts therewithin. This column is in fluidtight connection with the kettle and also its jacket outwardly thereof where the column joins therewith or passes therethrough. Provision is made for steam to enter within the column so that the fluid body within the kettle may be heated from its center as well as elsewhere. Also the scraper units employed to maintain a continual scraping of the circular walls within the kettle is an important feature of this invention. Each scraper unit may be removed from or replaced upon its associated stirring arm by an endwise motion which produces a sliding interlock therebetween which, with the aid of gravity alone, will assure maintenance of the scraper unit in a fixed position that is predetermined by the stop. The ease of removal and replacement of each scraper unit is a highly advantageous feature because it facilitates this operation which should take place regularly each time the mixer is put to use in order that all parts and surfaces within the kettle may be properly cleaned.

It is further to be noted that two sets of oppositely rotating stirring arms are provided to maintain the kettle contents in a thoroughly mixed condition while subjected to heat from the steam that is introduced into the chambers both interiorly and exteriorly of the kettle. The operation of these stirring arms is in response to rotation of transmission parts deriving motion from a power source that is carried below the kettle on a cradle that is mounted to tilt therewith. The simplicity and compactness of this arrangement is obvious. At the same time the motor and transmission gears are readily accessible to receive service at any time.

We claim:

1. In combination with a mixing kettle provided with a stirring arm adapted to be rotated therearound at substantially a uniform distance from its walls, a scraper unit carried by the stirring arm comprising a mounting bar, brackets affixed to the mounting bar and extended laterally therefrom and slidable on the stirring arm into and out of interlocking engagement with said stirring arm, means for releasably holding the bracket in its interlocked relation with the stirring arm, a plurality of scraper blades pivotally carried by the mounting bar, and spring means associated with the scraper blades for biasing the same yieldingly to a position of engagement with the kettle walls whereby to scrape the same during rotation of the stirring arm therewithin.

2. In combination with a mixing kettle provided with a stirring arm adapted to be rotated therearound at substantially a uniform distance from its walls, a scraper unit carried by the stirring arm comprising a mounting bar, brackets affixed to the mounting bar and extended laterally therefrom for locking connection with the stirring arm, a plurality of scraper blades pivotally carried by the mounting bar, a stop on the stirring arm with which one of the brackets may engage to fix the vertical position of the mounting bar relative to the stirring arm, and spring means associated with the scraper blades for biasing the same yieldingly to a position of engagement with the kettle walls whereby to scrape the same during rotation of the stirring arm therewithin.

3. In combination with a mixing kettle provided with a stirring arm adapted to be rotated therearound at substantially a uniform distance from its walls, a scraper unit carried by the stirring arm comprising a mounting bar, means carried by the mounting bar and extended laterally therefrom for sliding locking connection with the stirring arm, a plurality of scraper blades pivotally carried by the mounting bar, and spring means associated with the scraper blades for biasing the same yieldingly to a position of engagement with the kettle walls whereby to scrape the same during rotation of the stirring arm therewithin.

4. The combination with a bowl-shaped mixing kettle provided with a stirring arm having a lengthwise contour similar to that of the sides of the mixing kettle whereby to remain substantially uniformly spaced therefrom, of means for rotating the stirring arm said stirring arm comprising a mounting bar having an edgewise contour substantially the same as that of the stirring arm adapted to be carried thereby in a position proximate to the kettle walls, brackets carried by the mounting bar and extended laterally therefrom to the stirring arm and slidable thereon into and out of interlocking engagement therewith, means for releasably locking the brackets in their interlocked relation with the stirring arms, a plurality of scraper plates pivotally carried by the mounting bar, and spring means associated with the scraper blades for biasing the same yieldingly to a position of engagement with the kettle walls whereby to scrape the same during rotation of the stirring arm therewithin.

5. The combination with a bowl-shaped mixing kettle provided with a stirring arm having a lengthwise contour similar to that of the sides of the mixing kettle whereby to remain substantially uniformly spaced therefrom, of means for rotating the stirring arm about a vertical axis within the kettle, a scraper unit carried by the stirring arm comprising a mounting bar having an endwise contour substantially the same as that of the stirring arm adapted to be carried thereby in a position proximate to the kettle walls, means carried by the mounting bar and extended laterally therefrom to the stirring arm and slidable thereon into and out of interlocking engagement therewith, means for releasably locking the mounting bar in said interlocked engagement with the stirring arm, a plurality of scraper plates pivotally carried by the mounting bar, and spring means associated with the scraper blades for biasing the same yieldingly to a position of engagement with the kettle walls whereby to scrape the same during rotation of the stirring arm therewithin.

6. In combination with a mixing kettle, a stirring arm mounted to rotate within the kettle proximate to circular walls therewithin, a scraper unit comprising a mounting bar, means extending between the stirring arm and mounting bar carried by one and slidable on the other for interlocking engagement therewith, means for releasably locking said slidable means against sliding movement to secure the mounting bar to the stirring arm in a fixed position thereupon, a plurality of scraper blades movably carried by the mounting bar, and spring means associated with the scraper blades for urging the same yieldingly to a position of engagement with the circular walls within the kettle whereby to scrape the same during rotation of the stirring arm therewithin.

7. In combination with a mixing kettle, a pair of oppositely disposed stirring arms mounted to rotate within the kettle proximate to circular walls therewithin always at opposite sides thereof, a scraper unit for each stirring arm, each unit comprising a mounting bar, means extending between the mounting bar and its associated arm carried by one and slidable on the other into and out of interlocking engagement therewith, means for releasably locking said slidable means against sliding movement to secure the mounting bar to the stirring arm in a fixed position thereupon, a plurality of spaced scraper blades movably carried by each mounting bar, the blades of one bar being staggered with respect to those of the other bar to occupy positions substantially coextensive with the spacings between the blades thereupon, and spring means associated with the scraper blades for urging the same yieldingly to a position of engagement with the circular walls within the kettle whereby to scrape the same through adjacent circular paths during rotation of the stirring arms therewithin.

RICHARD J. SAVAGE.
ROBERT E. SAVAGE.

REFERENCES CITED

The following references are of record in the file of this patent:

UNITED STATES PATENTS

| Number | Name | Date |
|---|---|---|
| 499,890 | Savage | June 20, 1893 |
| 938,201 | Aeschbach | Oct. 26, 1909 |
| 1,021,301 | Clough | Mar. 26, 1912 |
| 1,154,051 | Owens | Sept. 21, 1915 |
| 1,426,118 | Sonsthagen | Aug. 15, 1922 |
| 1,432,323 | Druce | Oct. 17, 1922 |
| 1,497,454 | Light | June 10, 1924 |
| 1,692,022 | Babitzky et al. | Nov. 20, 1928 |
| 1,801,685 | Olson | Apr. 21, 1931 |
| 2,155,454 | Temple | Apr. 25, 1939 |